United States Patent
Parviainen et al.

(10) Patent No.: US 10,477,387 B2
(45) Date of Patent: Nov. 12, 2019

(54) METHOD, A NETWORK NODE AND A SYSTEM FOR TRIGGERING A TRANSMISSION OF SENSOR DATA FROM A WIRELESS DEVICE

(71) Applicant: Kone Corporation, Helsinki (FI)

(72) Inventors: Olli Parviainen, Helsinki (FI); Jouko Kinnari, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 15/891,761

(22) Filed: Feb. 8, 2018

(65) Prior Publication Data

US 2018/0249324 A1    Aug. 30, 2018

(30) Foreign Application Priority Data

Feb. 28, 2017 (EP) .................................. 17158338

(51) Int. Cl.
| | |
|---|---|
| H04W 8/24 | (2009.01) |
| H04L 29/08 | (2006.01) |
| H04W 4/70 | (2018.01) |
| H04W 84/18 | (2009.01) |

(52) U.S. Cl.
CPC ............. *H04W 8/24* (2013.01); *H04L 67/12* (2013.01); *H04W 4/70* (2018.02); *H04W 84/18* (2013.01)

(58) Field of Classification Search
CPC ......... H04W 8/24; H04W 4/70; H04W 84/18; H04L 67/12
See application file for complete search history.

(56) References Cited

U.S. PATENT DOCUMENTS

| | | | | |
|---|---|---|---|---|
| 9,325,792 | B2* | 4/2016 | Hallman | H04L 67/12 |
| 2008/0061959 | A1* | 3/2008 | Breed | B60C 11/24 |
| | | | | 340/539.1 |
| 2010/0208637 | A1* | 8/2010 | Park | H04L 47/14 |
| | | | | 370/311 |
| 2012/0106520 | A1* | 5/2012 | Champaney | H04W 74/0875 |
| | | | | 370/336 |
| 2012/0155301 | A1* | 6/2012 | Miyazaki | H04L 43/00 |
| | | | | 370/252 |
| 2015/0003475 | A1* | 1/2015 | Savolainen | H04L 69/324 |
| | | | | 370/474 |
| 2016/0148501 | A1 | 5/2016 | Mou et al. | |

FOREIGN PATENT DOCUMENTS

WO    WO-2016/099984 A1    6/2016

OTHER PUBLICATIONS

European Search Report #17158338 dated Aug. 24, 2017.

* cited by examiner

*Primary Examiner* — Curtis A Alia
(74) *Attorney, Agent, or Firm* — Harness, Dickey & Pierce, P.L.C.

(57) ABSTRACT

The invention relates to a method for triggering a transmission of sensor data from a wireless device comprising at least one accelerometer. The wireless device is arranged to an automatic door. The method comprises: receiving from the wireless device data processed from the sensor data; analyzing the received data processed from the sensor data; and generating a control signal to the wireless device in response to a detection of a predefined event, wherein the control signal comprises at least a request to the wireless device to trigger the transmission of sensor data. The invention also relates to a network node and a system performing at least partly the method.

11 Claims, 4 Drawing Sheets

METHOD, A NETWORK NODE AND A SYSTEM FOR TRIGGERING A TRANSMISSION OF SENSOR DATA FROM A WIRELESS DEVICE

This application claims priority to European Patent Application No. EP171583388 filed on Feb. 28, 2017, the entire contents of which are incorporated herein by reference.

TECHNICAL FIELD

The invention concerns in general the technical field of wireless transmission of data. Especially the invention concerns transmission of data from a wireless device arranged to an automatic door.

BACKGROUND

Typically wireless devices, for example wireless sensors, obtain sensor data, such as raw unprocessed data, and the internal processors of the wireless devices process the obtained sensor data. The wireless devices may be arranged to an automatic door. The wireless device may be a door sensor comprising an accelerometer, for example. The processing may be for example calibration, filtering, converting, scaling, etc. Next the wireless device may transmit over a wireless communication link the outcome of the processed sensor data to an external unit, such as a cloud server, network node, etc., for further processing and storing, for example. Typically the wireless devices are battery operated devices. In some implementations of the battery-operated wireless devices, for example in elevator environment, changing of the battery will usually require a visit of service personnel which increases the costs.

Transmitting data over the wireless communication link consumes substantially much power. In order to achieve low power consumption and long battery life the amount of data that need to be transmitted over the wireless communication link should be minimized. The processing operations of the wireless devices that may compress the essence out of the obtained sensor data, and reduce amount of transmitted data, are essential for optimizing the power consumption and battery life of the wireless device.

However, in some cases the access to the sensor data would be useful, for example for developers. Some examples of this kind of cases would be anomalies in device behavior or programming errors in the algorithm codes.

Such issues are difficult to inspect and/or analyze without having access to the original sensor data. However, the transmission of the sensor data from the wireless device to the external unit is usually impractical, because it would multiply the amount of data to be transmitted over the wireless communication link. Thus, it would also decimate the battery life of the wireless device.

SUMMARY

An objective of the invention is to present a method, a network node, and a system for triggering a transmission of sensor data from a wireless device comprising at least one accelerometer. Another objective of the invention is that the method, the network node, and the system for triggering a transmission of sensor data from a wireless device comprising at least one accelerometer enable an on-demand access to sensor data of a wireless device.

The objectives of the invention are reached by a method, a network node, and a system as defined by the respective independent claims.

According to a first aspect, a method for triggering a transmission of sensor data from a wireless device comprising at least one accelerometer is provided, wherein the wireless device is arranged to an automatic door, wherein the method comprises: receiving from the wireless device data processed from the sensor data; analyzing the received data processed from the sensor data; and generating a control signal to the wireless device in response to a detection of a predefined event, wherein the control signal comprises at least a request to the wireless device to trigger the transmission of sensor data.

The control signal may further comprise at least one parameter for selecting sensor data to be transmitted, wherein the parameter may be at least one of the following: period of time, amount of data.

Furthermore, the predefined event may be at least one of the following: anomaly in the data processed from the sensor data, defect in the data processed from the sensor data, predefined time scheme, received command signal, error in the algorithm for processing the sensor data.

The data processed from the sensor data may be received continuously or according to a predefined time scheme.

The method may further comprise receiving the sensor data transmitted from the wireless device for further processing and/or storing.

According to a second aspect, a network node for triggering a transmission of sensor data from a wireless device comprising at least one accelerometer is provided, wherein the wireless device is arranged to an automatic door, wherein the network node comprising: one or more processors, and one or more memories for storing at least one portion of computer program code, the one or more processors is configured to cause the network node at least to perform: receive from the wireless device data processed from the sensor data; analyze the received data processed from the sensor data; and generate a control signal to the wireless device in response to a detection of a predefined event, wherein the control signal comprises at least a request to the wireless device to trigger the transmission of sensor data.

The control signal may further comprise at least one parameter for selecting sensor data to be transmitted, wherein the parameter may be at least one of the following: period of time, amount of data.

Furthermore, the predefined event may be at least one of the following: anomaly in the data processed from the sensor data, defect in the data processed from the sensor data, predefined time scheme, received command signal.

The network node may be configured to receive the data processed from the sensor data continuously or according to a predefined time scheme.

The network node may be further configured to receive the sensor data transmitted from the wireless device for further processing and/or storing.

According to a third aspect, a system for triggering a transmission of sensor data from a wireless device comprising at least one accelerometer is provided, wherein the wireless device is arranged to an automatic door, wherein the system comprises: one or more wireless devices, and a network node configured to: receive from the wireless device data processed from the sensor data; analyze the received data processed from the sensor data; and generate a control signal to the wireless device in response to a detection of a predefined event, wherein the control signal comprises at least a request to the wireless device to trigger the transmission of sensor data, wherein the network node and the one or more wireless devices are communicatively coupled to each other.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
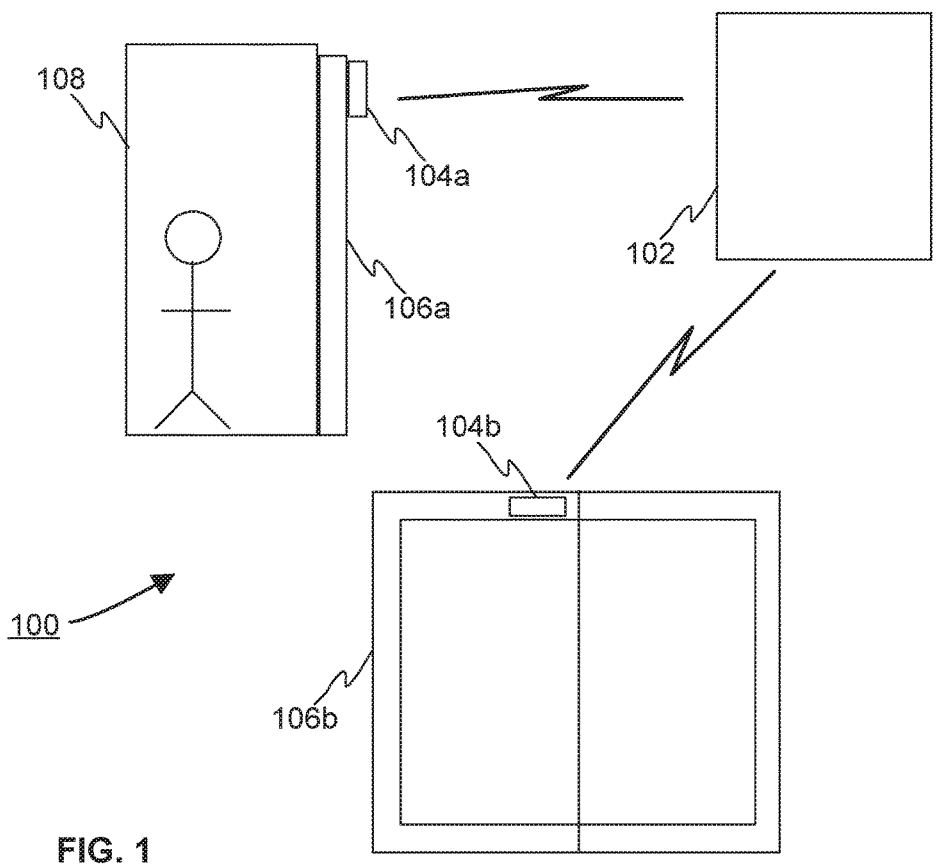
FIG. 1 illustrates schematically an example of the system according to the invention.

FIG. 1 illustrates schematically an example of a system 100, wherein the embodiments of the invention may be implemented as will be described. A system 100 according to the invention comprises a network node 102 and one or more wireless devices 104. The network node 102 and the one or more wireless device are communicatively coupled to each other as will be described later. FIG. 1 illustrates an example system comprising two wireless devices 104a, 104b, but the system may comprise any number of wireless devices suitable for the system according to the invention. The wireless device 104 may be implemented in any automatic door environment. Some examples of implementation environments are at least the following: elevator environment, building environment. In the example system illustrated in FIG. 1 the first wireless device 104a is arranged to an automatic door 106a of an elevator car 108 and the second wireless device 104b is arranged to an automatic door 106b of a building. The system according to the invention may comprise wireless devices attached to automatic doors residing in the same building and/or a difference building.

Figure 2:
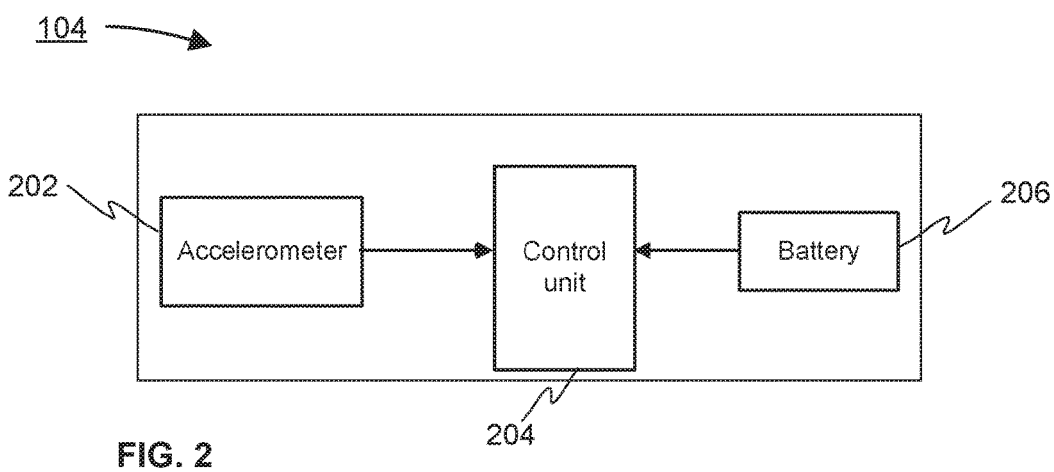
FIG. 2 illustrates schematically an example of the wireless device according to the invention.

A wireless device 104 may be arranged to an automatic door for obtaining acceleration information of the automatic door. FIG. 2 schematically illustrates a simple example of a wireless device 104 according to the invention. The wireless device 104 comprises an accelerometer 202, a control unit 204, an energy storage 206. The energy storage 206, such as a battery, is configured to provide operating power for the wireless device 104. The accelerometer 202 and the control unit 204 of the wireless device 104 are described more in detail later in this application.

The wireless device 104 may be fixed to the automatic door, for example to any moving part of the automatic door, by any known fixing means. Some non-limiting examples of the fixing means may be at least one of the following: screw, bolt, tape, cable tie, hook-and-loop fastener. The moving part of the automatic door to which the device may be fixed, may be for example, door panel or hanger plate. The accelerometer 202 in the context of this application refers to any sensor suitable for detect physical acceleration.

The accelerometer 202 of the wireless device 104 may be configured to obtain sensor data, i.e. raw data, representing acceleration of the automatic door. In the context of this application the sensor data, i.e. raw data, means measurement data that is not processed. In the context of this application the amplification of the sensor data, conversion of a physical quantity of the sensor data to another physical quantity and/or manner of representation of the sensor data are not considered to be processing of data. For example, a conversion of a measured capacitance value to a voltage or current value is not considered to be processing. The sensor data representing the acceleration may be for example, magnitude of the acceleration, direction of the acceleration as a vector quantity, vibration, shock. The control unit 204 and/or the accelerometer 202 of the wireless device 104 may be configured to store the obtained sensor data in the at least one memory of the control unit 204 of the wireless device 104 or in the buffer of the accelerometer 202 of the wireless device 104. Furthermore, a processor of the control unit 204 of the wireless device 104 is configured to process the obtained sensor data. The processing of the sensor data may comprise for example calibration, filtering, converting, scaling, deducting, averaging, differentiating, integrating, etc. The processing of the sensor data may be considered as a process, wherein one signal is input into a device and another signal is output from the device so that the signal itself is processed. The wireless device 104 is further configured to transmit the data processed from the sensor data to a network node 102. The wireless device 104 may transmit the data processed from the sensor data continuously or according to a predefined time scheme. The data transmission according to a predefined time scheme means that the data is not communicated from the wireless device 104 to network node 102 continuously. Instead the data may be transmitted at a time instant, which the control unit 204 of the wireless device 104 defines to be suitable for the transmission. A suitable time instant may be for example one of the following: regular time interval, irregular time interval, when no data is communicated from the accelerometer 202 to the control unit 204. Transmitting the information from the wireless device 104 to the network node 102 according to the predefined time scheme enables reducing power consumption of the wireless device 104 and longer battery life of the wireless device 104.

The wireless device 104 is configured to transmit data over a wireless communication link to the network node 102. The wireless communication between the wireless device 104 and the network node 102 may be based on for example at least one of the following wireless communication technologies: Bluetooth, WiFi, Cellular network, Zigbee, Lora, ANT. The transmission of data over the wireless communication link consumes substantially considerable amount of power. Thus, the wireless device 104 is configured to transmit the data processed from the sensor data in order to reduce the amount of data that is required to be transmitted over the wireless communication link. This reduces at least partly the power consumption of the wireless device 104. Furthermore, it enables longer battery life.

However, at the side of the network node 102 there may be further a need to get access to the sensor data instead of the data processed from the sensor data, for example in response to a detection of a predefined event. In some cases the access to the sensor data would be useful, for example for developers. Furthermore, such events are difficult to inspect and/or analyze without having access to the original sensor data. The predefined event may be for example at least one of the following: anomaly in the data processed from the sensor data, defect in the data processed from the sensor data, predefined time scheme, received command signal, errors in the algorithm for processing the sensor data. The command signal may be received, for example from a service center, a maintenance person, etc. The predefined time scheme may be a scheme comprising predefined time instants at which time sensor data may be required.

Figure 3:
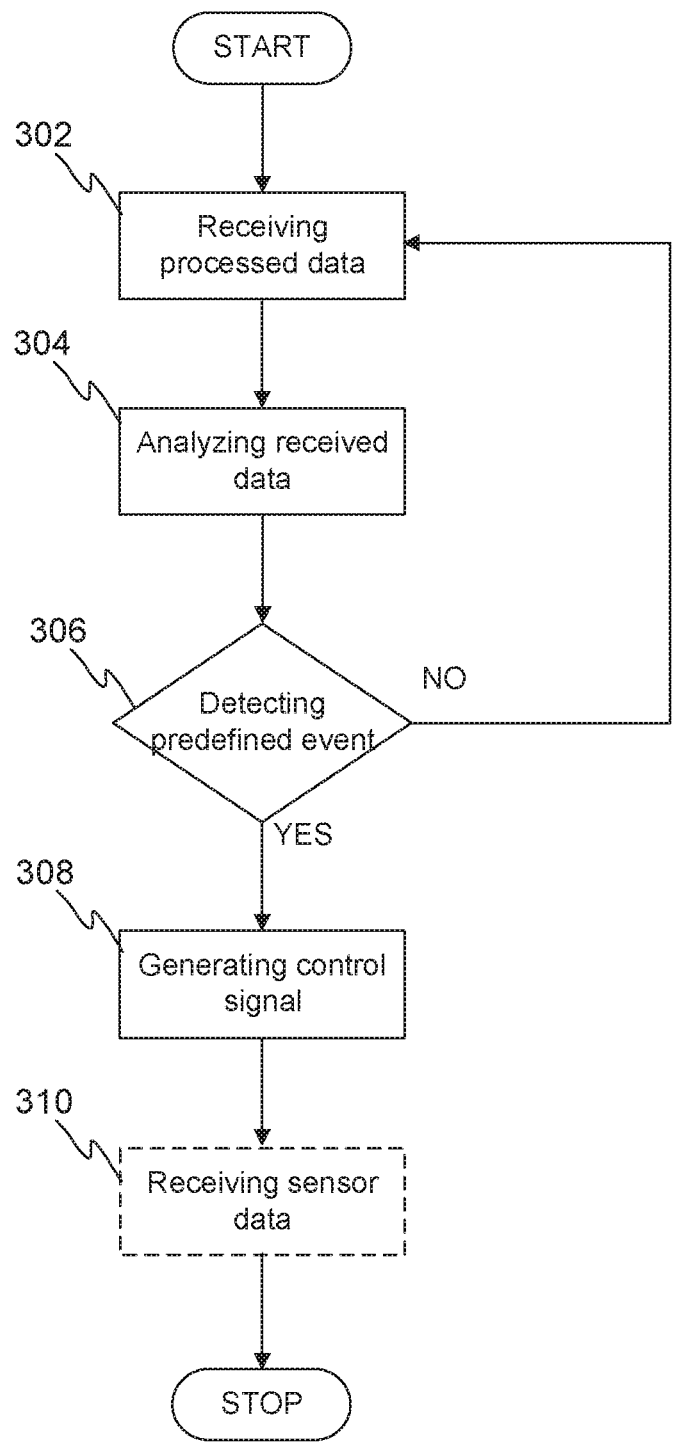
FIG. 3 illustrates schematically an example of the method according to the invention.

The method according to the invention enables triggering a transmission of sensor data from a wireless device. Next an example of a method according to the invention is described by referring to FIG. 3. FIG. 3 schematically illustrates the invention as a flow chart. As described the network node 102 receives 302 from the wireless device 104 data processed from the sensor data. The data processed from the sensor data may be received continuously or according to a predefined time scheme as described above. The network node 102 analyses 304 the received data processed from the sensor data. In response that the network node 102 detects 306 a predefined event described above, the network node 102 generates 308 a control signal to the wireless device 104. The control signal may comprise at least a request to the wireless device to trigger the transmission of the sensor data. Additionally, the network node 102 may further receive 310 the sensor data transmitted from the wireless device 104 for further processing and/or storing. The further processing and/or storing may comprise solving the reason for the anomaly in the data processed from the sensor data or defect in the data processed from the sensor data etc. Alternatively or in addition, after receiving the sensor data transmitted from the wireless device 104 the network node 102 may continue receiving data processed from the sensor data from the wireless device 104 and further analyzing the received data as described in the context of the steps 302 and 304. Similarly, if the network node 102 does not detect a predefined event at the step 306, the network node 102 may continue performing the steps 302 and 304.

The control signal may comprise only a request to the wireless device to trigger the transmission of the sensor data. In this case the transmission of sensor data from the wireless device 104 is triggered in response to receiving the control signal. The network node 102 may further generate a second control signal to the wireless device 104 in response that the network node 102 detects 306 another predefined event. The second control signal may comprise at least a request to the wireless device 104 to end the transmission of the sensor data.

In addition, the control signal may further comprise at least one parameter for selecting sensor data to be transmitted. The parameter may be at least one of the following: period of time, amount of data. The period of time may be any period of time before generation of the control signal. Alternatively or in addition, the period of time may be any period of time after generation of the control signal. If the control signal comprises certain period of time as a parameter, the wireless device 104 is requested to trigger the transmission of the sensor data obtained by the accelerometer during said period of time. The period of time may comprise a starting time stamp together with an ending time stamp or duration of the period. Alternatively, the period of the time may comprise only the duration of the period, when the wireless device 104 is requested to transmit the sensor data starting from reception of the control signal during said period of time. Similarly, if the control signal comprises certain amount of data as a parameter, the wireless device 104 is requested to trigger the transmission of the sensor data obtained by the accelerometer of the wireless device 104 during said amount of data. Alternatively or in addition, the control signal may comprise a starting time stamp together with the amount of data to be transmitted.

Alternatively, the request may be implemented as the at least one parameter for selecting sensor data to be transmitted. This means that in response to receiving the at least one parameter, the wireless device is requested to trigger the transmission of the sensor data obtained by the accelerometer of the wireless device according to the received at least one parameter.

The control signal may further comprise an identification code of the wireless device 104 to which the control signal is addressed. The identification code may be for example a unique identifier, an address, etc. The identification code may be used especially in a system comprising more than one wireless device 104.

After the wireless device 104 is configured to end the transmission of the sensor data, the wireless device is configured to enter back into normal operation of the wireless device, i.e. transmission of data processed from the sensor data.

Preferably, the period of time of the transmission of sensor data and/or the amount of transmitted sensor data from the one or more wireless devices 104 may be substantially limited, i.e. short time or small amount of data, in comparison to the transmission time and/or amount of data processed from the sensor data. This enables an effective way to gather sensor data from one or more wireless devices only, because the sensor data may be transmitted only when necessary. Moreover, the on-demand transmission of the sensor data enables that the transmission of the sensor data does not increase substantially the power consumption of the wireless device and thus not reduce substantially battery life of the wireless device.

Figure 4:
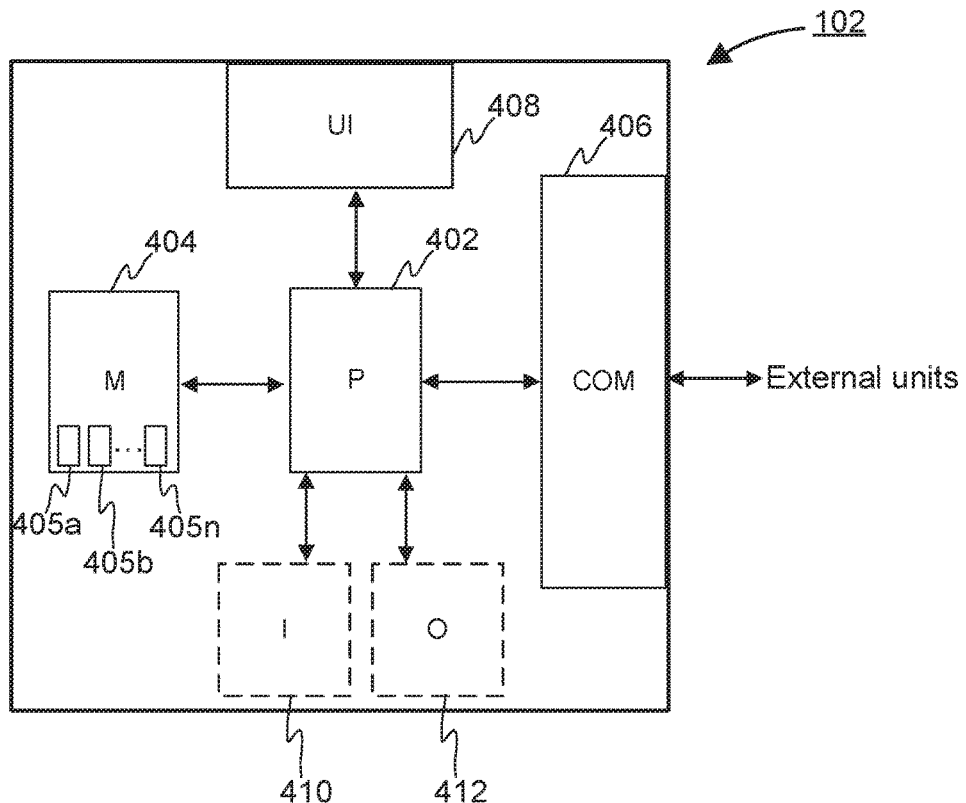
FIG. 4 illustrates schematically an example of the network node according to the invention.

FIG. 4 illustrates schematically an example of the network node 102 according to the invention. The network node 102 may be for example one of the following: external server, remote server, database server, mobile server, cloud server. The network node 102 may comprise one or more processors 402, one or more memories 404, communication interface 406, and user interface 408. The mentioned elements may be communicatively coupled to each other with e.g. an internal bus. The memory 404 is configured to store at least one portion of computer program code 405a-405n and any data values. The memory 404 is not limited to a certain type of memory only, but any memory type suitable for storing the described pieces of information may be applied in the context of the invention. The communication interface 406 enables the network node 102 to communicate with any external unit, such as wireless devices 104, other network nodes, database, and/or other systems.

The communication interface 406 of the network node 102 may be based on one or more known communication technologies, either wired or wireless, in order to exchange pieces of information as described earlier.

The network node 102 may further comprise input means 410 and/or output means 412. The input means 410 may comprise any known mechanism for inputting information to the network node 102. Some examples of input means 410 may be for example, a keyboard, a mouse, a touch screen and/or a pen, etc. The output means 412, in turn, may comprise any known mechanism for outputting information. Some examples of the output means 412 may be for example a display, printer, and/or speaker, etc. Alternatively or in addition, the input means 410 and/or output means 412 may be coupled to the network node 102 via the communication interface 406 either with some known wired or wireless manner.

The one or more processor 402 of the network node 102 is at least configured to implement at least some method steps as described above. The implementation of the method may be achieved by arranging the one or more processors 403 to execute at least some portion of computer program code 405a-405n stored in the one or more memories 404 causing the one or more processors 402, and thus the network node 102, to implement one or more method steps as described above. The one or more processors 402 are thus arranged to access the one or more memories 404 and retrieve and store any information therefrom and thereto. Moreover, the one or more processors 402 are configured to control the communication through the communication interface 406 with any external unit, such as with a wireless device 104. For sake of clarity, the processor herein refers to any unit suitable for processing information and control the operation of the network node 102, among other tasks. The operations may also be implemented with a microcontroller solution with embedded software.

As said, FIG. 4 illustrates an example of the network node 102 according to the invention. All implementation of the network node 102 do not comprise all of the elements disclosed in FIG. 4. Alternatively, some implementation of the network node 102 may comprise some further elements.

Figure 5:
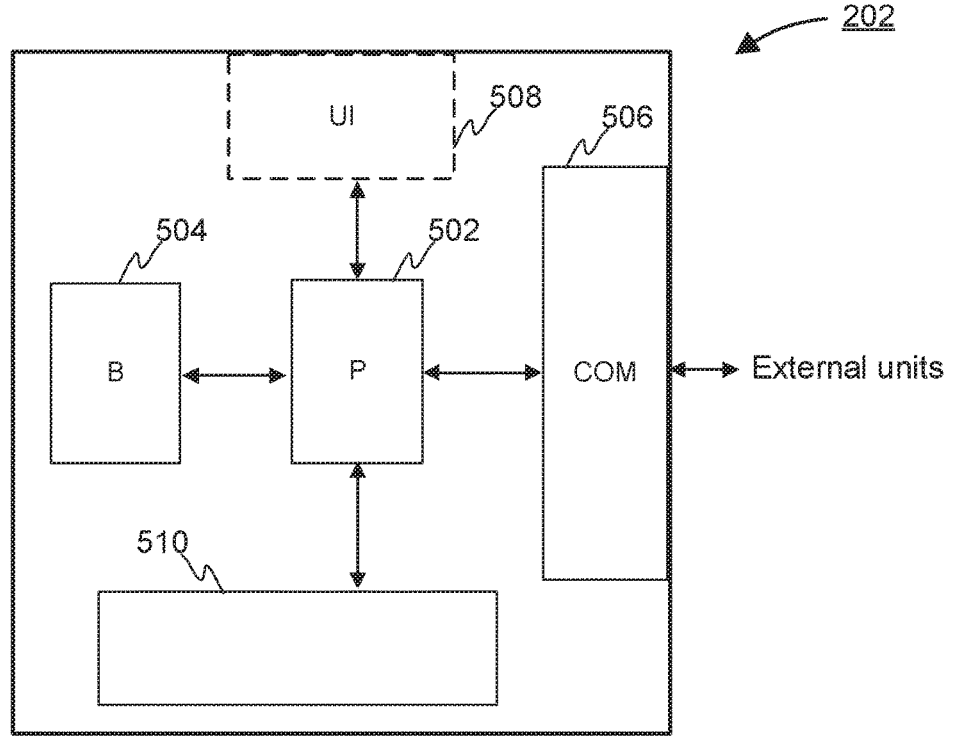
FIG. 5 illustrates schematically an example of an accelerometer of the wireless device according to the invention.

FIG. 5 illustrates schematically an example of the accelerometer 202 of the wireless device according to the invention. The accelerometer 202 may comprise at least one processor 502, a communication interface 506, at least one internal buffer 504, a user interface 508, and sensor relating devices 510. The mentioned elements may be communicatively coupled to each other with e.g. an internal bus. The sensor related devices 510 may comprise, but are not limited to, one or more components for obtaining sensor data representing the acceleration of the automatic door. The communication interface 506 may provide interface for communication with any external unit, such as with a control 204 unit of the wireless device 104, in order to exchange pieces of information as described. The one or more internal buffers 504 may be configured to store any data. The at least one processor 502 of the accelerometer may be configured to at least control the operation of the accelerometer 202.

Figure 6:
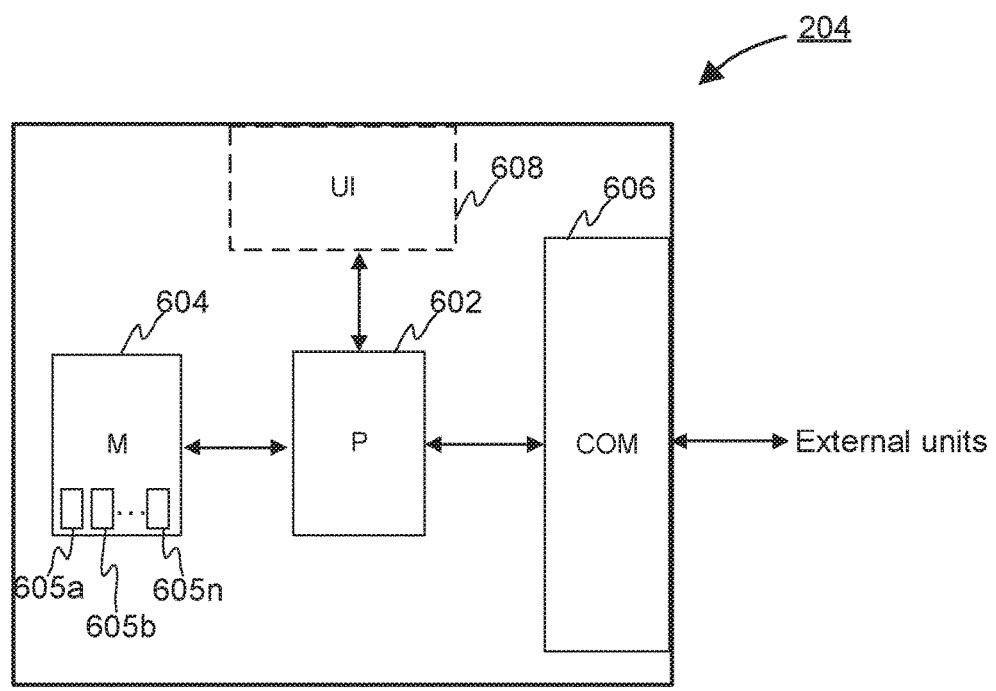
FIG. 6 illustrates schematically an example of a control unit of the wireless device according to the invention.

As described the wireless device 102 comprises further a control unit 204 at least configured to control at least some of the operation of the wireless device 104. FIG. 6 illustrates schematically an example of the control unit 204 of the wireless device 104 according to the invention. The control unit 204 comprises at least one processor 602 and at least one memory 604 for storing at least one portion of computer program code 605a-605n and any data values. Furthermore, the control unit 204 of the wireless device 104 may comprise a communication interface 606 in order to provide interface for communication with any external unit, such as accelerometer 202, database and/or external systems, such as network node 102 in order to exchange pieces of information as described. The communication interface may be based on one or more known communication technologies, either wired or wireless, in order to exchange pieces of information as described earlier. Furthermore, the control unit 204 of the wireless device 104 may comprise a user interface 608. The mentioned elements may be communicatively coupled to each other with e.g. an internal bus. For sake of clarity, the processor herein refers to any unit suitable for processing information and control the operation of the control unit 204 of the wireless device 104, among other tasks. The operations may also be implemented with a microcontroller solution with embedded software. Similarly, the memory is not limited to a certain type of memory only, but any memory type suitable for storing the described pieces of information may be applied in the context of the present invention.

The processor 602 of the control unit 204 of the wireless device 104 is at least configured to implement at least some operations of the control unit 204 of the wireless device 104 as described. The implementation of the operations of the control unit 204 of the wireless device 104 may be achieved by arranging the processor 602 to execute at least some portion of computer program code 605a-605n stored in the memory causing the processor 602, and thus the control unit 204 of the wireless device 104, to implement one or more operations of the control unit 204 of the wireless device 104. The processor 602 is thus arranged to access the memory 604 and retrieve and store any information therefrom and thereto. Moreover, the processor 602 is configured to control the communication through the communication interface 606 with any external unit, such as with a network node 102. According to one embodiment of the invention the control unit 204 may be implemented as a system-on-a-chip, SOC. SOC herein refers to an integrated circuit that integrates all components of the system into a single chip. One advantage of implementing the control unit as a SOC is low power consumption.

Above it is described that the wireless device 104 may transmit the sensor data and/or the data processed from the sensor data directly to the network node. Alternatively, the wireless device 104 may transmit the sensor data and/or the data processed from the sensor data through a gate way device or another network node to the network node 102. Similarly, the control signal generated by the network node 102 may be transmitted to one or more wireless devices 104 directly or through a gate way device or another network node.

The above described method, network node, and system enables an effective way to gather sensor data from one or more wireless devices. Thus, also the analysis of the sensor data may be enabled at the network node. Furthermore, the invention enables a flexible on-demand access to sensor data of one or more wireless devices without compromising battery life of the wireless device.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method comprising:
   receiving processed data from a wireless device, based on the wireless device generating first sensor data and the wireless device further processing the first sensor data to generate the processed data, the wireless device including at least one accelerometer, the wireless device coupled to an automatic door;

analyzing the received processed data; and transmitting a control signal to the wireless device, in response to a detection of a predefined event based on the analyzing the received processed data, to cause the wireless device to transmit the first sensor data such that the first sensor data is received from the wireless device.

2. The method according to claim 1, wherein the control signal includes at least one parameter indicating at least one portion of the first sensor data to be transmitted by the wireless device, wherein the parameter is at least one of a period of time, and an amount of data.

3. The method according to claim 1, wherein the predefined event is at least one of:
- an anomaly in the processed data received from the wireless device,
- a defect in the processed data received from the wireless device,
- a predefined time scheme,
- a received command signal, or
- an error in an algorithm for processing the sensor data.

4. The method according to claim 1, wherein the processed data is received from the wireless device continuously or according to a predefined time scheme.

5. The method according to claim 1, further comprising: receiving the first sensor data transmitted from the wireless device for further processing and/or storing.

6. A network node comprising:
one or more memories storing at least one portion of computer program code; and
one or more processors configured to execute the at least one portion of computer program code to cause the network node:
receive processed data from a wireless device, based on the wireless device generating first sensor data and the wireless device further processing the first sensor data to generate the processed data, the wireless device including at least one accelerometer, the wireless device arranged to an automatic door;
analyze the received processed data; and
transmit a control signal to the wireless device, in response to a detection of a predefined event based on the analyzing the received processed data, to cause the wireless device to transmit the first sensor data such that the first sensor data is received from the wireless device.

7. The network node according to claim 6, wherein the control signal includes at least one parameter indicating at least one portion of the first sensor data to be transmitted by the wireless device, wherein the parameter is at least one of a period of time, and an amount of data.

8. The network node according to claim 6, wherein the predefined event is at least one:
- an anomaly in the processed data received from the wireless device,
- a defect in the processed data received from the wireless device,
- a predefined time scheme, or
- a received command signal.

9. The network node according to claim 6, wherein the network node is configured to receive the processed data from the wireless device continuously or according to a predefined time scheme.

10. The network node according to claim 6, wherein the network node is further configured to receive the first sensor data transmitted from the wireless device for further processing and/or storing.

11. A system comprising:
a wireless device, the wireless device including at least one accelerometer, the wireless device coupled to an automatic door, the wireless device configured to
generate first sensor data, and
process the first sensor data to generate processed data, and
a network node configured to
receive the processed data from the wireless device,
analyze the received processed data, and
transmit a control signal to the wireless device, in response to a detection of a predefined event based on the analyzing the received processed data, to cause the wireless device to transmit the first sensor data to the network node,
wherein the network node and the wireless device are communicatively coupled to each other.

* * * * *